United States Patent
Rice et al.

(10) Patent No.: US 8,254,017 B2
(45) Date of Patent: Aug. 28, 2012

(54) OPTICAL FIBER AMPLIFIER AND METHODS OF MAKING THE SAME

(75) Inventors: Robert R. Rice, Simi Valley, CA (US); Michael G. Wickham, Rancho Palos Verdes, CA (US); Hiroshi Komine, Torrance, CA (US); Peter Livingston, Palos Verdes, CA (US); Peter Thielen, Torrance, CA (US); Charles Phillip Asman, Long Beach, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 553 days.

(21) Appl. No.: 12/407,470

(22) Filed: Mar. 19, 2009

(65) Prior Publication Data

US 2010/0238538 A1    Sep. 23, 2010

(51) Int. Cl.
*C03B 37/016* (2006.01)
*C03B 37/075* (2006.01)
*H04B 10/17* (2006.01)

(52) U.S. Cl. ........... 359/341.1; 65/395; 65/397; 65/398; 65/412; 65/413; 65/415; 65/436; 65/440

(58) Field of Classification Search ............... 359/341.1; 65/395, 397, 398, 412, 413, 415, 436, 440
See application file for complete search history.

(56) References Cited

U.S. PATENT DOCUMENTS

| 4,494,968 | A  | * | 1/1985 | Bhagavatula et al. | ........... 65/386 |
| 7,437,040 | B2 |   | 10/2008 | Flammer | |
| 2007/0019283 | A1 | * | 1/2007 | Mermelstein et al. | ........ 359/334 |
| 2007/0081779 | A1 | * | 4/2007 | Flammer | ........................ 385/123 |
| 2008/0175278 | A1 | * | 7/2008 | Dragic | ............................. 372/6 |
| 2009/0080472 | A1 | * | 3/2009 | Yao et al. | ........................... 372/6 |

FOREIGN PATENT DOCUMENTS

JP    2009-32910 A  *  2/2009

OTHER PUBLICATIONS

Dragic, et al.: "*Optical Fiber with an Acoustic Guiding Layer for Stimulated Brillouin Scattering Suppression*"; 2005 Conference on Lasers & Electro-Optics (CLEO); p. 1984-1986.
Shiraki, et al.: "*SBS Threshold of a Fiber with a Brillouin Frequency Shift Distribution*"; Journal of Lightwave Technology, vol. 14, No. 1, Jan. 1996, p. 50-57.

* cited by examiner

*Primary Examiner* — Eric Bolda
(74) *Attorney, Agent, or Firm* — Tarolli, Sundheim, Covell & Tummino LLP

(57) ABSTRACT

A method is provided for forming an optical fiber amplifier. The method comprises providing a composite preform having a gain material core that includes one or more acoustic velocity varying dopants to provide a longitudinally varying acoustic velocity profile along the gain material core to suppress Stimulated Brillouin Scattering (SBS) effects by raising the SBS threshold and drawing the composite preform to form the optical fiber amplifier.

19 Claims, 8 Drawing Sheets

OPTICAL FIBER AMPLIFIER AND METHODS OF MAKING THE SAME

TECHNICAL FIELD

The present invention relates to optics, and more particularly to an optical fiber amplifier and methods of making the same.

BACKGROUND OF THE INVENTION

Stimulated Brillouin Scattering (SBS) refers to nonlinear effects in high power fibers under which optical power is unintentionally scattered inelastically in the backward direction. Scatter in the backward direction is caused by an interaction of photons and acoustic or vibrational phonons. Acoustics in the fiber are caused by electrostriction due to the electric field produced by the beam of light in the fiber. Acoustic energy in the fiber causes light to be reflected in the backward direction and consequently interferes with the propagation of light forward. This results in a drop of useful output signal. The frequency of the back scattered beam is slightly lower than that of the original beam.

The frequency shift corresponds to the frequency of emitted phonons due to the Stokes process. This shift, known as the Brillouin shift, is equal to the energy of the phonon excited by the propagating laser signal. The Brillouin shift is commonly measured by the use of an optical spectrum analyzer, or is based on a Fabry-Perot interferometer for high resolution measurements. At a sufficiently high power in the forward direction of the fiber, some of the signal is back scattered at the Brillouin shifted frequency. SBS is a process whereby nonlinear optical gain produces amplification of the back scattered light. That is, the interference with the light being propagated in the forward direction is not linearly related to the optical power. Instead, SBS effects are not incurred until an SBS threshold of optical power is met. Soon thereafter the SBS back scattered optical power overwhelms the optical power in the forward direction. Therefore, the higher the SBS threshold the more power can be transmitted successfully through the optical system.

SUMMARY OF THE INVENTION

In one aspect of the invention, a method is provided for forming an optical fiber amplifier. The method can comprise providing a composite preform having a gain material core that includes one or more acoustic velocity varying dopants to provide a longitudinally varying acoustic velocity profile along the gain material core to suppress Stimulated Brillouin Scattering (SBS) effects by raising the SBS threshold and drawing the composite preform to form the optical fiber amplifier.

In another aspect of the invention, a method of forming an optical fiber amplifier is provided. The method can comprise forming a plurality of gain material layers having varying dopant concentrations of one or more acoustic velocity varying dopants to provide varying acoustic velocity effects over the plurality of gain material layers and to provide a substantially uniform index of refraction over the plurality of gain material layers and removing at least one transverse section of the plurality of gain material layers to provide a gain material core with a longitudinally varying acoustic velocity profile and a substantially uniform index of refraction. The method further comprises inserting the gain material core into a cladding preform to form a composite preform and drawing the composite preform to form the optical fiber amplifier.

In yet another aspect of the invention, an optical fiber amplifier is provided. The amplifier can comprise a gain material core that extends axially along a length of the optical fiber amplifier, wherein the gain material core includes varied concentrations of one or more acoustic velocity varying dopants along a length of the gain material core to provide a longitudinally varying acoustic velocity profile to suppress SBS effects by raising the SBS threshold and an optical fiber cladding that surrounds the optical fiber core and extends axially along a length of the optical fiber device.

DETAILED DESCRIPTION OF INVENTION

Figure 1:
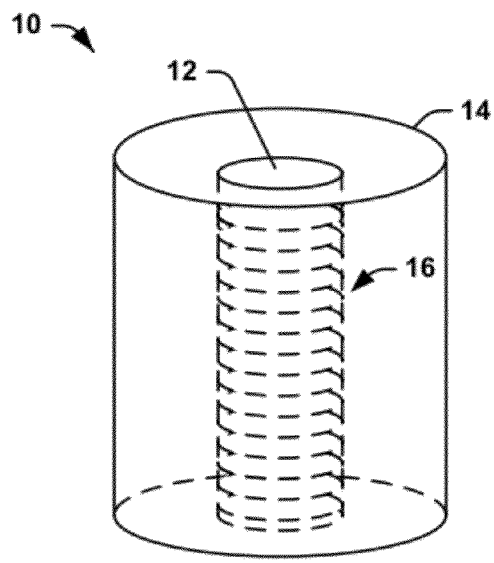
FIG. 1 demonstrates an example of a composite preform for forming an optical fiber amplifier in accordance with an aspect of the invention.

The present invention relates to a composition of a fiber core for an optical fiber amplifier that is longitudinally varied such that the optical properties (e.g., refractive index) of the fiber amplifier remain approximately constant, but the acoustic properties are varied periodically or aperiodically along the direction of propagation. Consequently, the mean Stimulated Brillouin Scattering (SBS) gain can be spread over a wide frequency range and the peak gain at a particular given frequency reduced accordingly. The effect on performance is similar to that achieved by spatial modulation of strain or temperature, but to a more significant degree and without the complications of such hardware implementations. Broadening the optical spectrum of the laser signal reduces the effective SBS gain. For example, assuming a Lorentzian laser spectra, the effective Brillouin gain coefficient scales with signal bandwidth, according to the following equation:

$$\tilde{g}_B = \frac{\Delta v_B}{\Delta v_B + \Delta v_l} g_B \quad \text{EQ. 1}$$

where $\Delta v_l$ is the laser linewidth, $\Delta v_B$ is the Brillouin linewidth and $g_B$ is the Brillouin gain for a narrow signal spectrum. Therefore, if the optical spectrum is broadened such that the signal's effective linewidth is greater than that of the Brillouin gain spectrum, the net SBS gain is reduced. Accordingly, if $\Delta v_l \gg \Delta v_B$ then SBS is effectively suppressed and other nonlinear effects set the power limit. However, $\Delta v_l$ can only be broadened to a certain extent. If the laser linewidth cannot be made arbitrarily wide, then a different strategy must be used to reduce the effective gain of the SBS process. An example of such a situation would be in constructing a coherent phased array of optical fiber amplifiers driven by a common master oscillator (MO), for which the coherent combining mechanism limits the practical linewidth of the signal because the fiber amplifier line lengths must be matched to significantly less than the signal coherence length as given by $L_{coh} = c/(n\Delta v_l)$.

The Brillouin frequency $v_B$ is given by $v_B = 2nv_A/\lambda_l$, where n is the core refractive index, $v_A$ is the acoustic velocity, and $\lambda_l$ is the laser wavelength. The acoustic velocity varies with temperature and strain, and one successful method for reducing the net effective Brillouin gain in a fiber amplifier is by stretching the fiber core differentially or applying a temperature gradient along its length. In this way, the Brillouin gain is high only for light Brillouin scattered and frequency shifted from that small portion of the fiber over which the scattered frequency is within the resonant gain width $\Delta v_B$ of the Brillouin gain process. The improvement in SBS threshold depends upon how large a spatial gradient in acoustic frequency can be achieved. Altering the composition of the fiber core such that the acoustic frequency is varied longitudinally over a large amount in an axial distance corresponding to the length of a typical high power fiber amplifier improves the SBS threshold by a similar amount for the same reason. The present invention focuses on modifying the composition of the fiber core to lower the Brillouin gain and consequently raise the SBS threshold.

The composition of the fiber core is longitudinally varied with dopant concentrations of one or more acoustic velocity varying dopants specifically chosen to maintain refractive index, but vary the acoustic velocity along the fiber, thereby raising the SBS threshold because the resonant Brillouin frequency $v_B$ now varies as a function of length along the fiber. In a fiber core, small amounts (e.g., less than 10%) of one or more acoustic velocity varying dopants can cause changes in both the optical and acoustic properties of the fiber core. For example, germanium, phosphorus, and titanium cause an increase in optical index, thus the velocity of light in the fiber core decreases. Germanium, phosphorus, and titanium also cause an increase in acoustic index, thereby also decreasing acoustic velocity in the fiber core. Other dopants, such as boron and fluorine, have the opposite effect and increase optical velocity but decrease acoustic velocity. This is demonstrated in the table below.

| PARAMETER | Ge | P | Ti | B | F | Al |
|---|---|---|---|---|---|---|
| Optical Index | ↑ | ↑ | ↑ | ↓ | ↓ | ↑ |
| Acoustic Velocity | ↓ | ↓ | ↓ | ↓ | ↓ | ↓ |
| Acoustic Index | ↑ | ↑ | ↑ | ↑ | ↑ | ↓ |

Therefore, a combination of dopants can be chosen such that there is an effect on acoustic velocity, but that the effect on the optical index is negligible. The combination of dopants ultimately depends on the application since the combination of dopants can be customized based on a particular application.

FIG. 1 demonstrates an example of a composite preform 10 for forming an optical fiber amplifier in accordance with an aspect of the invention. The composite preform 10 includes a gain material core 12 and a cladding material preform 14. The composite preform can be drawn to form an optical fiber amplifier. The gain material core can be formed of any of a variety of core materials (e.g., silica) doped with a gain dopant, such one or more rare earth dopants to provide amplification for the optical fiber amplifier. The gain material core 12 is fabricated such that it has dopant concentrations of one or more acoustic velocity varying dopants that vary longitudinally such that acoustic velocity in the gain material core 12 is affected, but the effect on optical properties (e.g., refractive index) is negligible. This can be accomplished by combining the one or more acoustic velocity varying dopants based on the acoustic and optical effects of the dopants. Dopants, such as germanium, phosphorus, aluminum, boron, fluorine, and titanium, can be used in varying concentrations to dope the gain material core 12. The varying concentrations of the one or more acoustic velocity varying dopants provide a longitudinally varying acoustic velocity profile 16 as shown in dashed lines along the gain material core to suppress Stimulated Brillouin Scattering (SBS) effects by raising the SBS threshold.

A number of techniques can be used to form the gain material core 12, such as, a composite plate technique, a 'candle-wick' technique, and a chemical vapor phase reactor technique. Furthermore, outside chemical vapor phase deposition techniques and inside chemical vapor phase deposition techniques can be employed to form the gain material core 12 with longitudinally varying dopant concentrations of the one or more acoustic velocity varying dopants. A spin coated sol-gel technique can also be used to form the gain material core 12 with longitudinally varying dopant concentrations of the one or more acoustic velocity varying dopants. One of ordinary skill in the art will appreciate that is not an exhaustive list of methods and techniques for fabricating the gain material core 12 with longitudinally varying dopant concentrations of the one or more acoustic velocity varying dopants, and that alternative methods and techniques could be employed.

The cladding material preform 14 can be any of a variety of glass materials. For example, the cladding material preform 14 can include oxide glasses, such as silicate glasses, phosphate glasses, germanate glasses, and the like. As another example, the cladding material preform 14 can include halide glasses, such as fluoride glasses. As yet another example, the cladding material preform 14 can include chalcogenides, such as sulfide glasses, selenide glasses, telluride glasses, and the like. By way of example, silica glass, borosilicate glass, and so forth can be utilized in forming the cladding material preform 14. Furthermore, the cladding material perform 14 can likewise be doped with any of a variety of dopants to achieve a desired refractive index.

The composite preform 10 can be formed by first forming the cladding material preform 14. In the example of FIG. 1, the cladding material preform 14 is demonstrated as substantially cylindrical. However, it is to be understood that the cladding material preform 14 can have any of a variety of cross-sectional shapes, such as rectangular, elliptical, or "D"-shaped. A hole is drilled in the cladding material preform 14, such as substantially at a center axis or cross-sectional centroid of the cladding material preform 14. The gain material core 12 is thus inserted or "sleaved" in the hole that has been drilled into the cladding material preform 14 and heated to fuse the composite preform together. The resultant composite preform 10 is then drawn into a resultant fiber amplifier, such as via a fiber drawing tower.

The resultant fiber amplifier maintains the properties of the gain material core 12, despite the significant decrease in radius from the gain material core 12 and the resultant fiber. Therefore, if the gain material core 12 is doped to change the optical or acoustic properties (e.g. index of refraction or acoustic velocity) the resultant fiber amplifier will have the changed optical or acoustic properties. Accordingly, the resultant fiber amplifier can be customized for a specific application by doping the gain material core 12.

Figure 2:
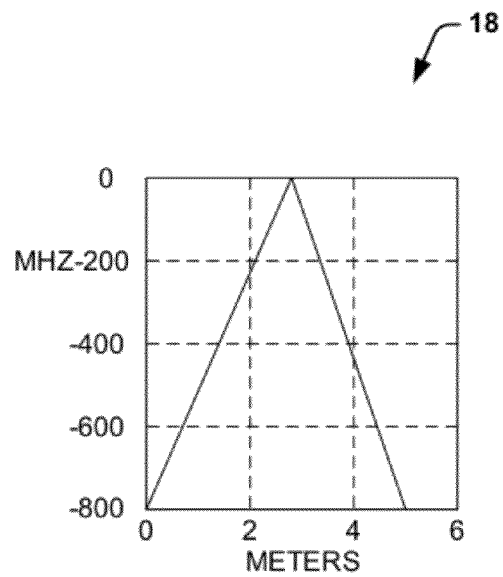
FIG. 2 illustrates a graph depicting a Brillouin frequency deviation ramp that plots back scattered light frequency shift versus amplifier fiber length in accordance with an aspect of the present invention.

FIG. 2 illustrates a graph depicting a frequency deviation ramp 18 that plots back scatter light frequency shift versus position along the amplifier fiber length in accordance with an aspect of the present invention. The frequency deviation ramp 18 is for an exemplary fiber amplifier with a fiber length of 5 meters, an optical input power of 10 watts, and an optical output power of 825.5 watts. The exemplary fiber amplifier has been doped with titanium dioxide and fluorine with a first dopant concentration of 1.5% by weight. The titanium dioxide and fluorine have been mixed in varying ratios along the length of the fiber such that the optical index is maintained substantially fixed along the length of the fiber but with a varying acoustic velocity profile.

As the dopant mixing ratios are varied along the length of the fiber, the resonant Brillouin frequency $v_B$ is also varied by a large amount along the length of the fiber. Therefore, the back scattered light is shifted in frequency over the longitudinal sections of the exemplary fiber such that the effective gain drops because the sections are no longer at the same center-line frequency due to the frequency shift at that longitudinal section. Accordingly, the sections do not create a strong back scattered wavelength from any particular given longitudinal section, thereby spreading the Brillouin gain over frequency by restricting the effective interaction length for amplification of a given frequency. Consequently, the SBS in the exemplary fiber is suppressed by 26.8 dB. This result was obtained using a high-fidelity model for SBS in a high power fiber amplifier.

Figure 3:
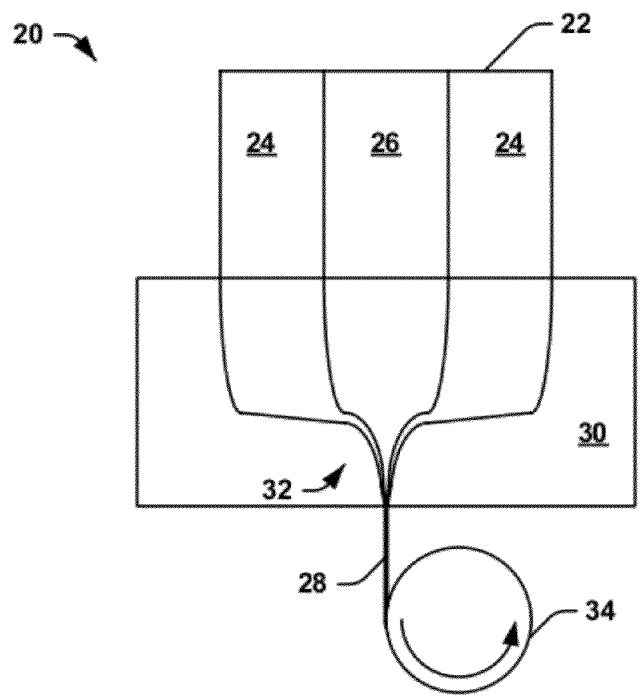
FIG. 3 demonstrates an example of a system for forming an optical fiber amplifier in accordance with an aspect of the invention.

FIG. 3 demonstrates an example of a system 20 for forming an optical fiber amplifier in accordance with an aspect of the invention. The system 20 demonstrates a composite preform 22 that includes a cladding material preform 24 and a gain material core 26, similar to the composite preform 10 in the example of FIG. 1. As such, the cladding material preform 24 can be formed from fused silica and the gain material core 26 can be formed from rare earth doped silica material further doped with one or more acoustic velocity varying dopants to provide a longitudinally varying acoustic velocity profile along the gain material core. In the example of FIG. 3, the composite preform 22 is being drawn to form an optical fiber amplifier 28. The optical fiber amplifier can have a length of about 2 meters to about 100 meters.

The system 20 includes a hot zone 30, such as can be included in a fiber drawing tower furnace. As an example, the hot zone 30 can apply heat that is sufficient to soften the cladding material preform 24 (e.g., silica) and to melt the core material rod 26. Thus, the composite preform 22 is stretched from a first end 32 to form the optical fiber 28. The optical fiber 28 is run through a polymer bath (not shown) as it leaves the hot zone 30, such that a jacketing material can be coated onto the optical fiber 28, and is subsequently wound around a take-up reel 34.

It is to be understood that the system 20 in the example of FIG. 3 is demonstrated simplistically, and that any of a combination of fiber forming techniques can be implemented in forming the resultant optical fiber amplifier 28. Therefore, the system 20 is not intended to be limited to the example of FIG. 3.

Figure 4:
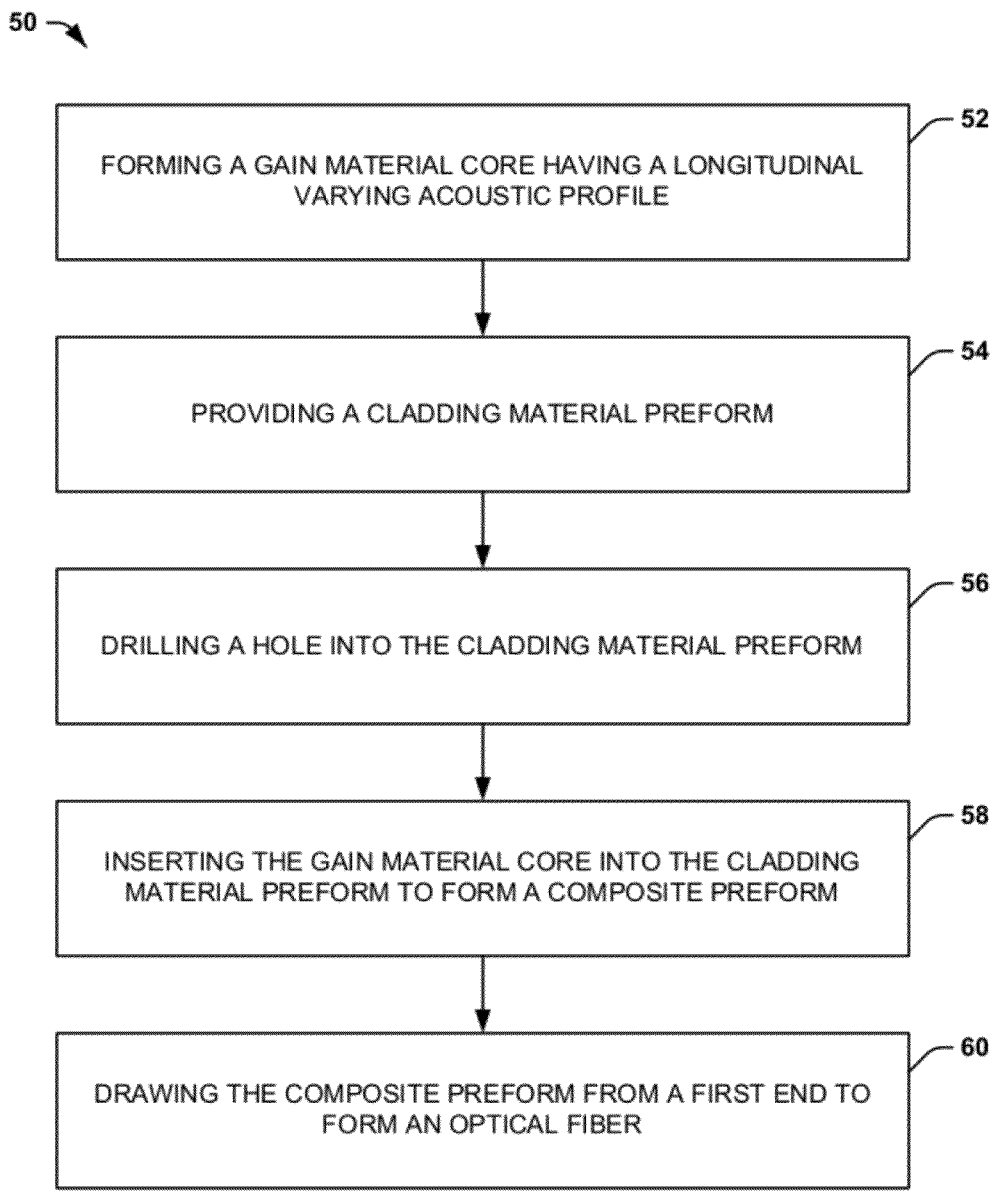
FIG. 4 demonstrates a flow diagram of a method for forming an optical fiber amplifier in accordance with an aspect of the invention.

In view of the foregoing structural and functional features described above, a methodology in accordance with various aspects of the present invention will be better appreciated with reference to FIG. 4. While, for purposes of simplicity of explanation, the methodology of FIG. 4 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 4 demonstrates a flow diagram of a method 50 for forming an optical fiber amplifier in accordance with an aspect of the invention. At 52, a gain material core having a longitudinal varying acoustic profile is formed. As will be discussed, this can be accomplished by a composite plate technique, a 'candle-wick' technique, a chemical vapor phase reactor technique, outside or inside chemical vapor phase deposition techniques or a spin coated sol-gel technique to form a preform with multiple gain material layers having varying acoustic velocity effects over the plurality of gain material layers. The gain material core can be doped with a gain dopant (e.g., rare earth dopant) to provide for amplifier amplification prior to, during or after the formation of the gain material core. A transverse section can be bored from the preform to create a gain material core having a longitudinal varying acoustic profile.

At 54, a cladding material preform is provided. As discussed above with respect to FIG. 1, the cladding material preform 14 can be any of a variety of glass materials. Also, the cladding material may be doped to achieve a specific index of refraction. At 56, a hole is drilled into the cladding material preform. The cladding material preform can have any variety of cross-sectional shapes, such as rectangular, elliptical, or "D"-shaped. Likewise the hole that is drilled into the cladding material may have a circular cross-section, or alternatively may have a rectangular, elliptical, or other shaped cross-section, but being constrained in that the core is of a matched shape to facilitate integration of the composite preform.

At 58, the core having a longitudinal varying acoustic profile is inserted into the cladding material preform to form a composite preform. The core can be shaped and polished such that the core fits suitably within the cladding material preform. At 60, the composite preform is drawn from a first end to form an optical fiber amplifier. This can be accomplished using a fiber drawing tower or other process similar to that demonstrated in FIG. 3.

Figure 5:
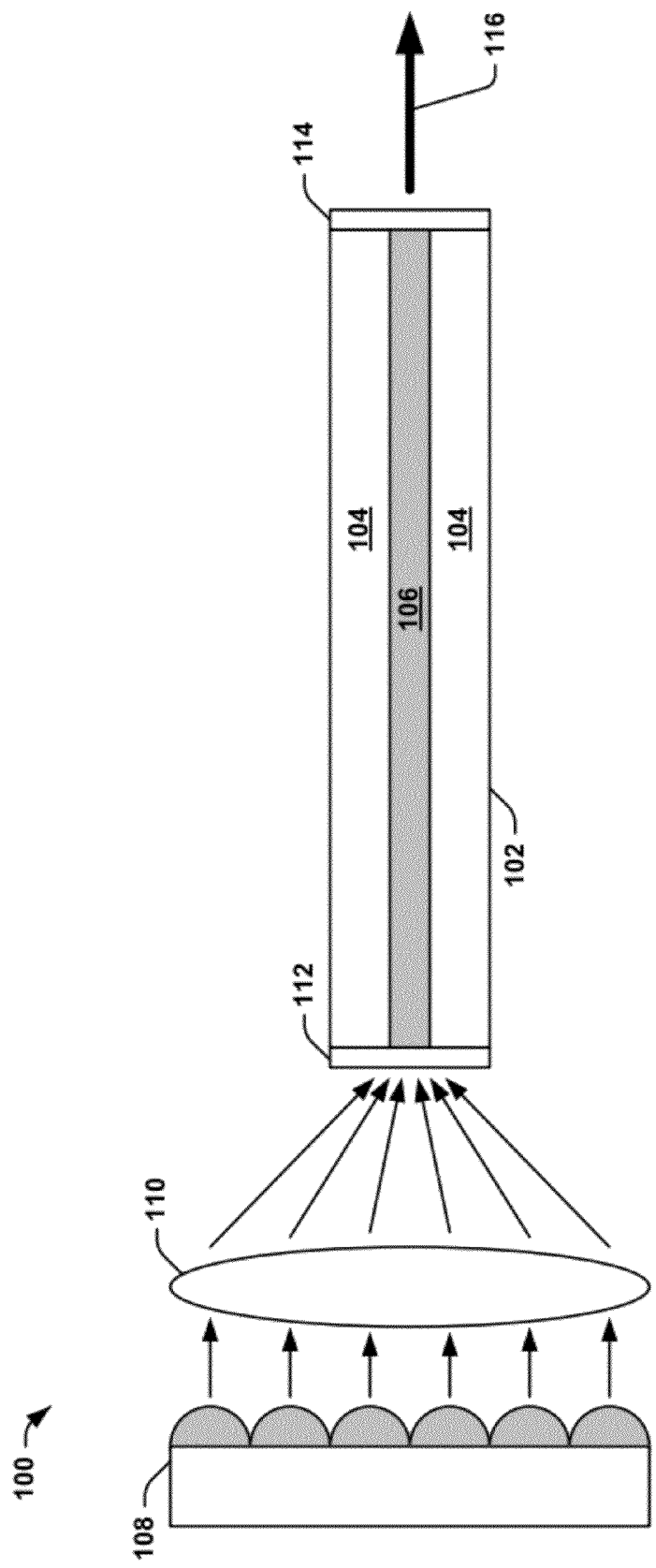
FIG. 5 demonstrates an example of an optical system in accordance with an aspect of the invention.

FIG. 5 demonstrates an example of an optical system 100 in accordance with an aspect of the invention. The optical system 100 can be implemented in any of a variety of optical applications, such as for optical network communications, industrial material processing or for optical imaging systems. The optical system 100 includes an optical fiber amplifier 102, such as the resultant optical fiber amplifier 28 in the example of FIG. 3. Therefore, the optical fiber amplifier 102 includes a cladding 104 which can be formed from fused silica, and a gain material core 106 can be formed from a rare earth doped silica doped with one or more acoustic velocity varying dopants.

A laser diode pump array 108 is configured to provide high brightness pump radiation to a focusing optic 110. The focusing optic 110 thus focuses the pump radiation and launches it into the optical fiber amplifier 102 through a high reflectivity mirror 112. A partially transmitting output mirror 114 is coupled to the optical fiber 102 at an opposite end of the optical fiber amplifier 102 from the high reflectivity mirror 112. As a result, the high brightness pump radiation is absorbed in the fiber core in the length of the fiber between the high reflectivity mirror 112 and the partially transmitting output mirror 114. Accordingly, the absorbed pump power excites the rare earth dopant in the core and so produces optical gain and laser action that results in a high efficiency conversion of the pump power to an output beam 116 through the partially transmitting output mirror 114.

It is to be understood that the optical system 110 is not limited to the example of FIG. 5. As an example, the optical system 100 is demonstrated simplistically in the example of FIG. 5. As such, additional optical components, such as additional lenses and/or mirrors can be included in the optical system 100. Therefore, the optical system 100 can be configured in any of a variety of ways, and can be implemented in any of a variety of high power optical fiber applications.

Figure 6:
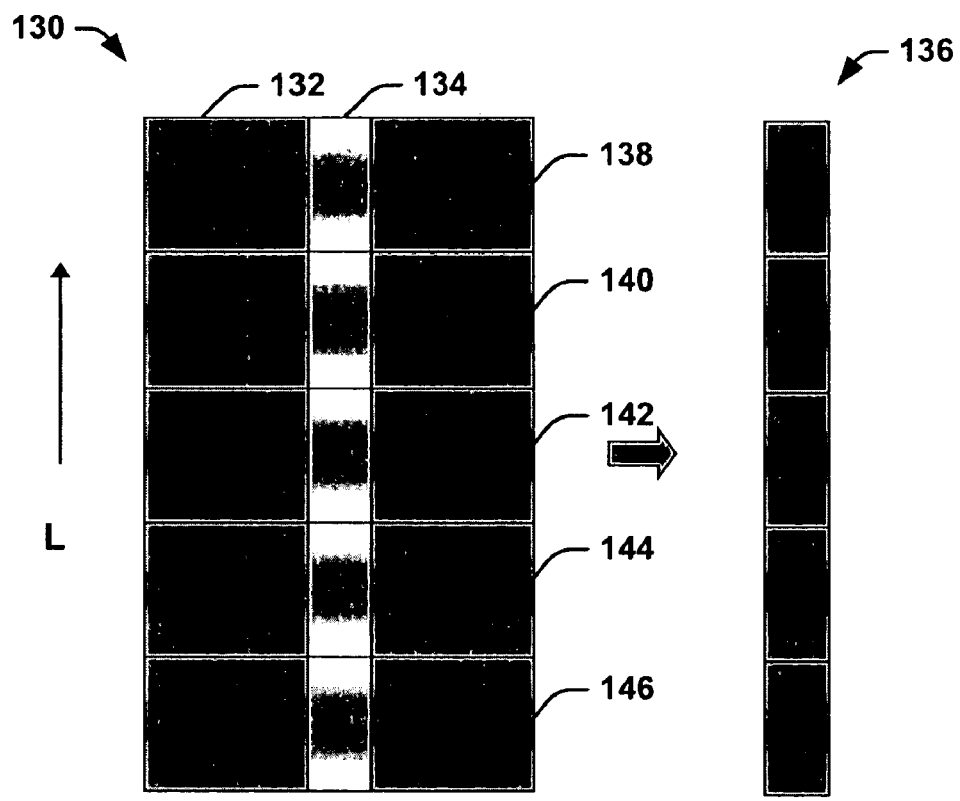
FIG. 6 demonstrates an example of a method for forming a gain material core employing a composite plate technique in accordance with an aspect of the invention.

FIG. 6 demonstrates an example of a method 130 for forming a gain material core employing a composite plate technique in accordance with an aspect of the invention. A gain material core 136 is fabricated having a longitudinally varying acoustic velocity profile using a composite plate technique for creating a vertically varying acoustic velocity preform 132. The gain material core 136 can be doped with a gain dopant (e.g., rare earth dopant) to provide for amplification prior to, during or after the formation of the gain material core 130. A plurality of sections of gain material glass 138, 140, 142, 144, and 146 are exposed to varying concentrations of one or more acoustic velocity varying dopants and prepared on flat substrates using flame deposition with varying dopant concentrations for each of the plurality of sections. The sections of glass are doped with varying concentrations of one or more acoustic velocity varying dopants such as germanium, phosphorus, titanium, boron, fluorine, and aluminum. The sections 138, 140, 142, 144, and 146 are bonded in a stacked arrangement to provide a vertically varying acoustic velocity preform 132. Therefore, the dopant concentration of a vertically varying acoustic velocity preform 132 can vary periodically or vary aperiodically and comprise one or more varying acoustic velocity sections. It is to be appreciated that a variety of acoustic velocity profiles can be achieved to match the requirements of a specific SBS suppressed amplifier design.

A transverse section 134 is bored longitudinally from the preform 132. The section 134 is, therefore, the gain material core 136 having a longitudinally varying acoustic velocity profile. Because the vertically varying acoustic velocity preform 132 varies periodically or aperiodically, the gain material core 136 has a longitudinally varying acoustic velocity profile. Therefore, the periodic or aperiodic variation of the gain material core 136 is separated into longitudinally acoustic velocity varying sections.

Figure 7:
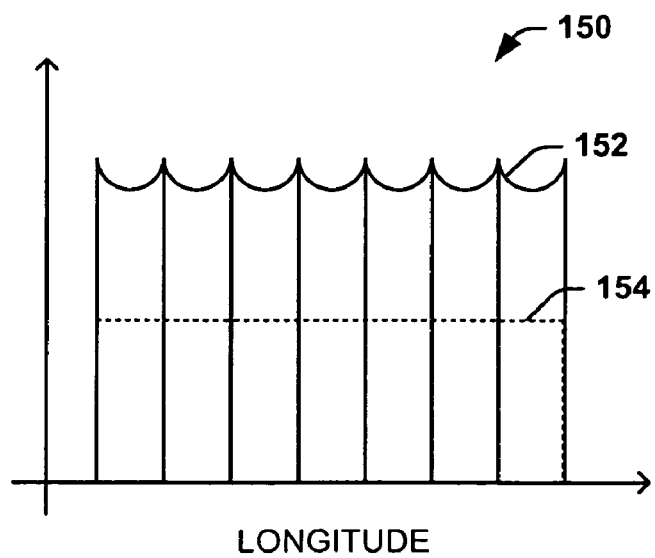
FIG. 7 illustrates a graph depicting acoustic velocity and index of refraction as a function of longitude in accordance with an aspect of the invention.

FIG. 7 illustrates a graph depicting acoustic velocity and index of refraction as a function of longitude in accordance with an aspect of the invention. In an optical fiber amplifier having a longitudinally varying dopant concentration of the one or more acoustic velocity varying dopants, the variance of the dopant concentration corresponds to variance of the acoustic velocity. Therefore, if the dopant concentration varies periodically as demonstrated in FIG. 6, the acoustic velocity profile 152 varies periodically. Each vertical section in the acoustic velocity profile 152 corresponds to a segment such as illustrated in FIG. 6 with segments 138, 140, 142, 144, and 146. It will be appreciated by one of skill in the art, that the acoustic velocity profile can be customized by modifying the dopant concentration of the one or more acoustic velocity varying dopants in each layer of a layered structure 132 as demonstrated in FIG. 6.

The dopant concentrations are chosen for their effect on the acoustic velocity profile 152 of the fiber amplifier, but are also chosen such that the index of refraction profile 154 remains substantially constant. Therefore, while the longitudinal acoustic velocity variation reduces the SBS gain to raise the SBS threshold, the index of refraction profile is not altered such that the light moving in the forward direction is not impeded.

Figure 8:
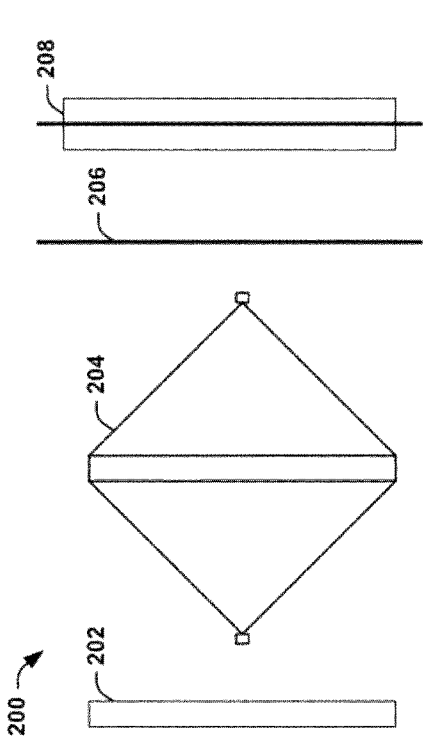
FIG. 8 demonstrates another example of a method for forming a gain material core employing a "candle-wick" technique in accordance with an aspect of the invention.

FIG. 8 demonstrates another example of a method for forming a gain material core employing a "candle-wick" technique in accordance with an aspect of the invention. Specifically, the gain material core is fabricated having a longitudinally varying acoustic velocity profile using a "candle-wick" technique. The gain material core can be doped with a gain dopant (e.g., rare earth dopant) to provide for amplifier amplification prior to, during or after the formation of the gain material core. A core fiber 202 with a high doping concentration of the one or more acoustic velocity varying dopants is provided as a "wick." At 204, a coating with a predetermined dopant concentration of the one or more acoustic velocity varying dopants is applied to the wick at 204. The dopant concentration is typically less than the doping concentration of the wick. A sol-gel slurry is an effective method for applying a coating because a sol-gel slurry is a wet chemical technique. The wet chemical technique can be more easily controlled than a gaseous technique. The coating is fused to the wick by applying a heat source to the wick at 206.

Steps 204 and 206 are repeated until the desired number of layers has been deposited on the wick. Each layer has different dopant concentration of the one or more acoustic velocity varying dopants than the layer that immediately precedes it and the layer that immediately follows it. Therefore, the each coating applied to the wick is doped differently from the coating that immediately precedes it and the coating that immediately follows. Typically, the highest doping concentration is at the gain material core fiber 202 and decreases in the layers radially outward from the core fiber 202.

At 208, a radially varying acoustic velocity preform has been fabricated. A transverse section is bored from the radially varying acoustic velocity preform to provide a gain material core with a longitudinally varying acoustic velocity profile. The transverse section is polished and inserted lengthwise into a cladding such that the dopant concentration varies longitudinally. Furthermore, a plurality of transverse sections can be shaped, polished, and inserted lengthwise into a cladding. Spacers can be placed in between each of the plurality of transverse section to prevent the plurality of transverse sections from interfering with each other during the drawing process. Typically, a single transverse section would be transformed to a single fiber amplifier during the draw process; hence many useful SBS suppressed fiber amplifiers of useful length will be produced from a single draw, thereby reducing cost per amplifier and conserving core material.

Figure 9:
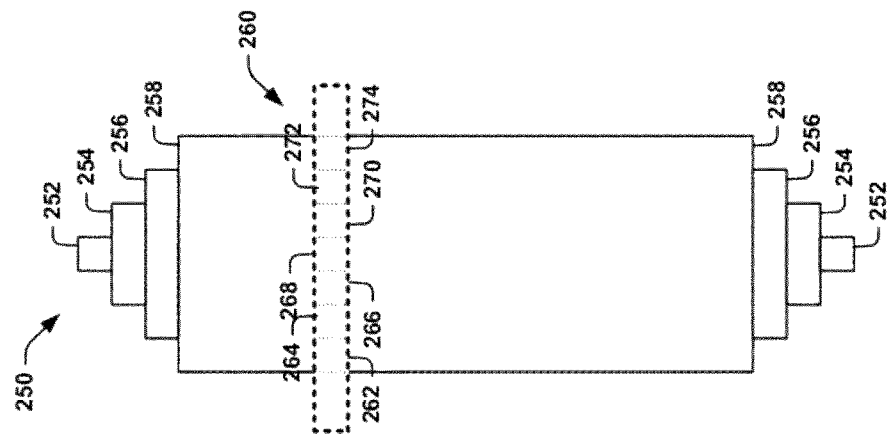
FIG. 9 illustrates a front view of a radially varying acoustic velocity preform and cross-sectional portion of the radially varying acoustic velocity preform shown in dashed lines in accordance with an aspect of the present invention.

FIG. 9 illustrates a front view of a radially varying acoustic velocity perform 250 and cross-sectional portion of the radially varying acoustic velocity preform shown in dashed lines in accordance with an aspect of the present invention. The radially varying acoustic velocity preform 250 varies dopant concentration radially, as could be fabricated using the candle-wick method described above with respect to FIG. 8. The preform 250 includes a plurality of layers centered axially about the core. Only four layers are shown in FIG. 9 for ease of illustration, however, one of ordinary skill in the art will appreciate that the preform 250 can be fabricated with more or less layers as desired.

Each layer of 252, 254, 256 and 258 has a dopant concentration of the one or more acoustic velocity varying dopants that is different than the dopant concentration of the layer that immediately precedes and immediately follows it. For example, layer 252 is formed such that it has a higher dopant concentration than layer 254. Likewise, layer 254 is formed such that it has a higher dopant concentration than layer 256, and layer 256 has a higher dopant concentration than layer 258. The varied dopant concentration in the preform 250 affects the acoustic velocity but is specifically tailored to not substantially affect the optical properties of the fiber. This can be accomplished by a combination of dopants specifically chosen such that the effect on the optical properties (e.g. index of refraction) is negligible.

A cross-sectional view of a transverse section 260 demonstrates the layered interior of the preform 250. Therefore, in a transverse section 260 the dopant does not vary radially but across the length of the transverse section. For example, the transverse section 260 of preform 250 has the same dopant concentrations at layer 262 and 274. Layers 264 and 272 have the same dopant concentration, which is higher than the dopant concentration of layer 262 and 274. Likewise, layers 266 and 270 have the same dopant concentration, which is higher than the dopant concentration of 264 and 272. Layer 268 has the highest dopant concentration. As discussed above with respect to FIG. 8 the transverse section of 260 is shaped, polished, and inserted in to a cladding preform.

Figure 10:
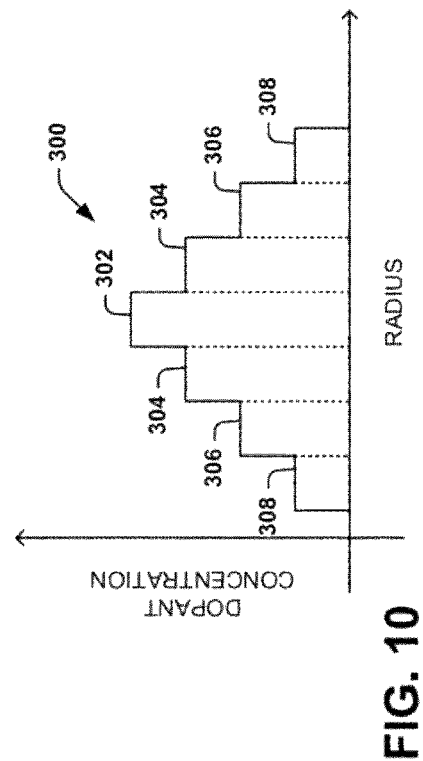
FIG. 10 demonstrates an example of a dopant concentration profile plotting dopant concentration of the one or more acoustic velocity varying dopants versus radius of the radially varying acoustic velocity preform of the example of FIG. 9 in accordance with an aspect of the invention.

FIG. 10 demonstrates an example of a dopant concentration profile 80 plotting dopant concentration of the one or more acoustic velocity varying dopants versus radius of the radially varying acoustic velocity preform 250 of the example of FIG. 9 in accordance with an aspect of the invention. The example of radially varying acoustic velocity preform 250 has an innermost layer 252, and layers radially extending from the innermost layer 252. FIG. 10 demonstrates that the dopant concentration decreases radially outward from the innermost layer 252, such that the highest dopant concentration is at layer 302. Therefore, the dopant concentration generally rises to a maximum value substantially centered at the axial center, layer and falling in each subsequent layer. As a result, the acoustic energy in the preform 250 is diverted to raise the SBS threshold.

Figure 11:
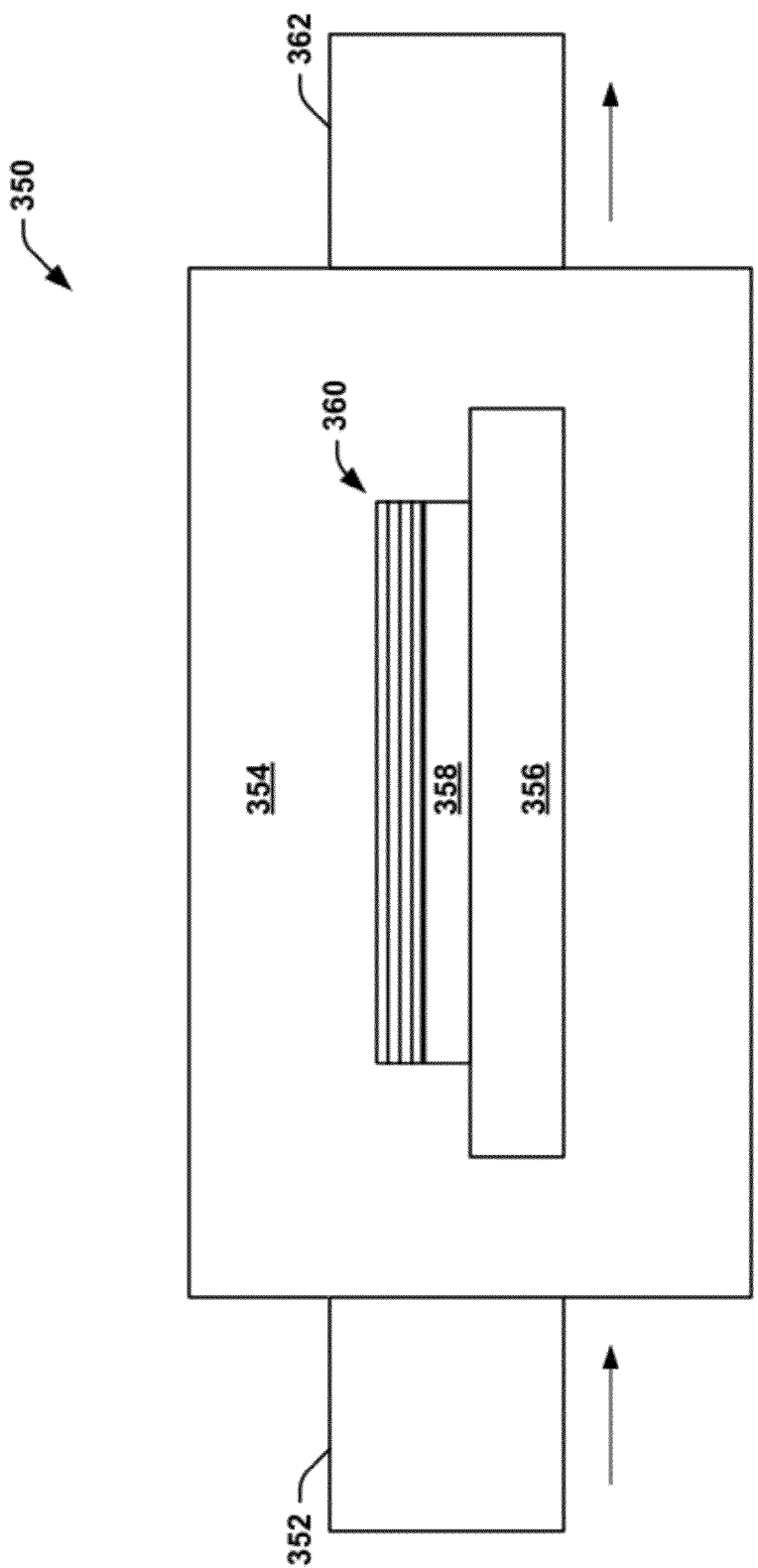
FIG. 11 demonstrates another example of a method for forming a gain material core employing a Vapor Phase Reactor technique in accordance with an aspect of the invention.

FIG. 11 demonstrates another example of a method for forming a gain material core employing a Chemical Vapor Phase Deposition technique in accordance with an aspect of the invention. The gain material core can be doped with a gain dopant (e.g., rare earth dopant) to provide for amplifier amplification prior to, during or after the formation of the gain material core. Specifically, a vertically varying acoustic velocity preform is fabricated using Chemical Vapor Phase Deposition techniques implemented in a Chemical Vapor Phase Reactor apparatus of conventional design. A gas doped with one or more acoustic velocity varying dopants is passed through an inlet port 352 into a reaction chamber 354. In the reaction chamber 354 the gas breaks down forming one of a plurality of doped glass layers 360 on a silica wafer 358.

The plurality of doped glass layers 360 and the silica wafer 358 that the doped glass layers 360 are grown on is placed on a rotating susceptor 356 to ensure uniformity of the plurality of doped glass layers 360. The susceptor 356 is heated and rotates as the gas breaks down. The heated rotation promotes uniformity due to centrifugal force. Any excess gas in the reaction chamber is flushed out through outlet port 362. Then, gas doped with a different dopant concentration of the one or more acoustic velocity varying dopants can be passed through the inlet port 352 and into the reaction chamber 354, resulting in one of a plurality of doped glass layers This process can be repeated as many times as necessary until the desired number of layers has been grown, or indeed the variation in acoustic velocity doping can be made essentially continuous in such an apparatus.

Rather than growing a radially varying preform, the chemical vapor phase reactor technique grows layers vertically as demonstrated by doped glass layers 360. A transverse section can be bored from the doped glass layers 360 to form a gain material core with a longitudinally varying acoustic velocity profile along the gain material core. The gain material core can be shaped and polished and inserted into a cladding material preform to form a composite preform.

Figure 12:
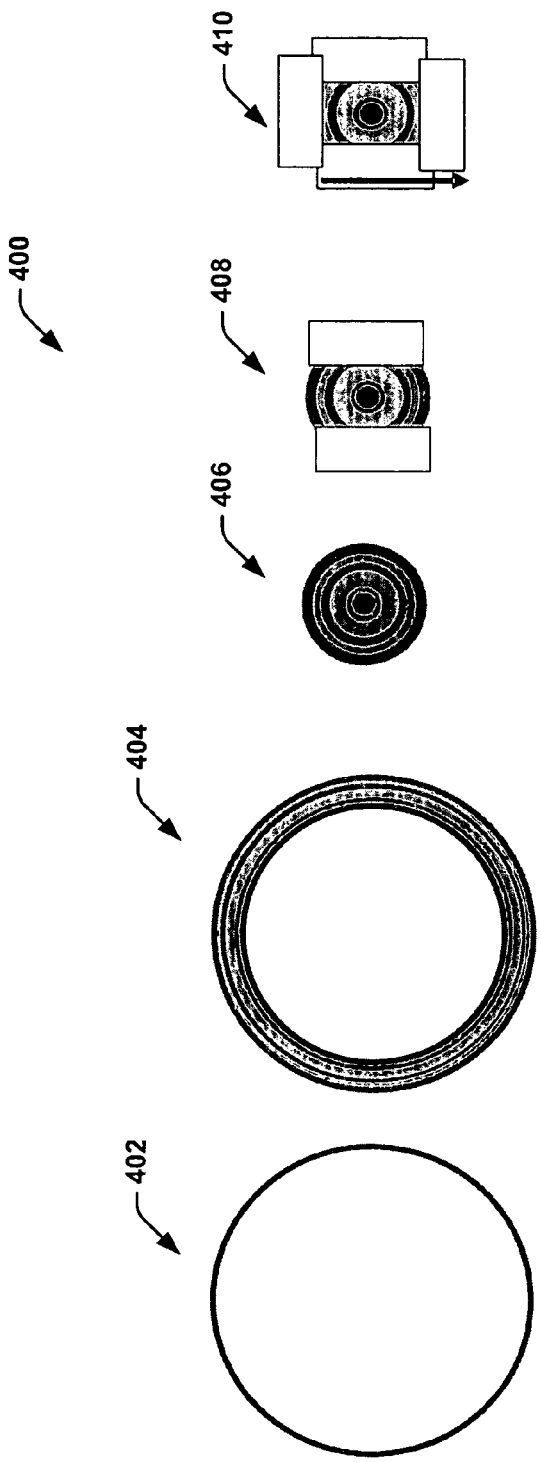
FIG. 12 illustrates another example of a method for forming a gain material core employing a Chemical Vapor Deposition technique in accordance with an aspect of the present invention.

FIG. 12 illustrates another example of a method for forming a gain material core employing a Chemical Vapor Phase Deposition technique in accordance with an aspect of the present invention. The gain material core 136 can be doped with a gain dopant (e.g., rare earth dopant) to provide for amplifier amplification prior to, during or after the formation of the gain material core. Specifically, a radially varying acoustic velocity preform can be fabricated using techniques such as Outside Chemical Vapor Phase Deposition (OCVPD) or Inside Chemical Vapor Phase Deposition (IVPO). The radially varying acoustic velocity preform begins as a cylinder 402 of optical fiber material (e.g. silica) that is hollow. The cylinder 402 is placed on a preform lathe and filled with a precursor gas such as silane, germane, metalorganic rare earth dopant and oxygen that is doped with one or more acoustic velocity varying dopants in the gas phase. The cylinder is then exposed to a heat source (e.g. hydrogen flame) on the order of $\approx 1000°$ K causing the precursor gases to breakdown and oxidize, thereby leaving a layer of chemical vapor deposition material that is not fully densified, referred to as "soot." Properties of the layers such as thickness and dopant concentration are determined by varying the flow rate and dopant ratio of the precursor gas as the cylinder 402 is exposed to the heat source.

This process of depositing a layer of soot with varying concentrations of the one or more acoustic velocity varying dopants is repeated to until the desired number of layers has been deposited inside or outside the soot layered cylinder 404. As a result, the soot layered cylinder 404 has a plurality of soot layers with each layer having a different dopant concentration of the one or more acoustic velocity varying dopants than the layer that immediately precedes it and the layer that immediately follows it, as discussed with regard to FIG. 8. In some rare earth doping processes, the sooty material is treated by a solution containing the rare earth dopant ion prior to further densification. Once the desired number of soot layers have been deposited, and rare earth solution doped if appropriate, the soot layered cylinder 404 is collapsed as shown at 406. The soot layered cylinder 404 is collapsed by exposing the soot layered cylinder 404 to a vacuum as the heat source is moved along the length of the soot layered cylinder 404. The spatial relationships between the layers are maintained as they were in the layer deposition process. As a result, the collapsed cylinder is a radially varying acoustic velocity preform 406.

A transverse section 408 is bored from the radially varying preform radially varying acoustic velocity preform 406 to provide a gain material core 410 with a longitudinally varying acoustic velocity profile. The gain material core 410 can be shaped and polished and inserted into a cladding material preform to form a composite preform. As an example, the transverse section 408 is approximately 3-4 millimeters in length with a diameter of approximately 1 millimeter. The transverse section 408 has a substantially constant index of refraction but a longitudinally varying acoustic velocity profile. As a result, gain material core 410 with a longitudinally varying acoustic velocity profile and a substantially constant index of refraction is fabricated. The longitudinal variation in the dopant concentration layers of the gain material core 410 is emphasized by the arrow along the side of the gain material core 410.

Figure 13:
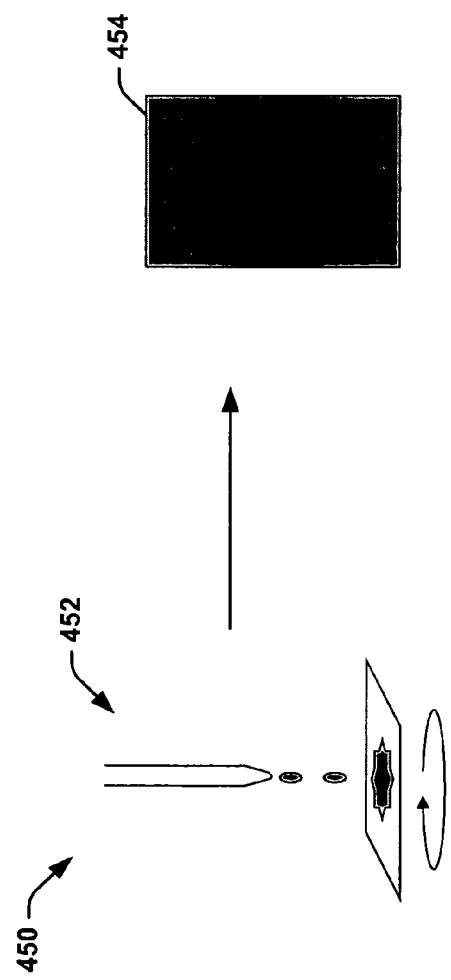
FIG. 13 demonstrates another example of a method for forming a gain material core employing a spin coating technique in accordance with an aspect of the invention.

FIG. 13 demonstrates another example of a method for forming a gain material core employing a spin coating technique in accordance with an aspect of the invention. The gain material core can be doped with a gain dopant (e.g., rare earth dopant) to provide for amplifier amplification prior to, during or after the formation of the gain material core. Specifically, a vertically varying acoustic velocity preform is fabricated using techniques such as spin coating sol-gel layers 450. Spin coating sol-gels layer is a process used in the semiconductor industry to apply thin coating to photoresists. This process can be used with silica based sol-gels doped with a gain material dopant to provide for amplifier amplification and one or more acoustic velocity varying dopants such as fluorine, germanium, titanium, phosphorus, boron, and aluminum to deposit layers with various dopant concentrations of the one or more acoustic velocity varying dopants.

At 452, an excess amount of doped solution with the one or more acoustic velocity varying dopants is placed on substrate. The substrate is rotated at a high speed by a spin coater in order to spread the fluid by centrifugal force. Rotation is continued while the fluid spins off the edges of the substrate, until the desired thickness of the layer is achieved. This is typically followed by a drying process and a heat treatment to further solidify the layer. The process at 452 is repeated with different concentrations of the one or more acoustic velocity varying dopants until the desired number of vertical layers have been deposited.

As discussed above with respect to the vapor phase reactor technique of FIG. 11, the spin coating sol gel 450 grows layers vertically as demonstrated by layered structure 454, rather than growing radially as illustrated in FIGS. 8 and 12. A transverse section can be bored from the doped glass layers 360 to form a gain material core with a longitudinally varying acoustic velocity profile along the gain material core. The gain material core can be shaped and polished and inserted into a cladding material preform to form a composite preform.

Figure 14:
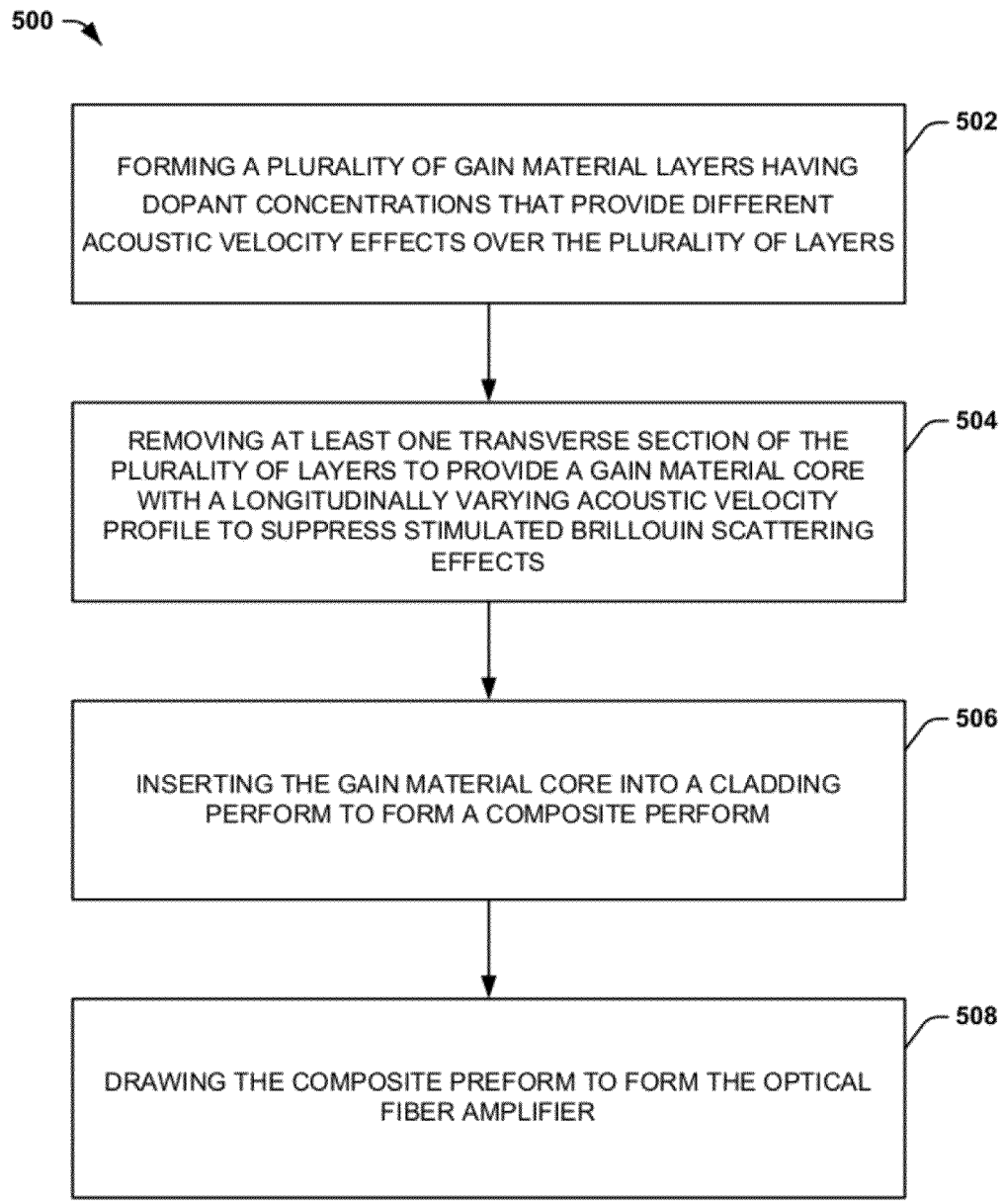
FIG. 14 demonstrates a flow diagram of another example of a method for forming an optical fiber amplifier in accordance with an aspect of the invention.

In view of the foregoing structural and functional features described above, a methodology in accordance with various aspects of the present invention will be better appreciated with reference to FIG. 14. While, for purposes of simplicity of explanation, the methodology of FIG. 14 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 14 demonstrates a flow diagram of another example of a method 500 for forming an optical fiber amplifier in accordance with an aspect of the invention. At 502, a plurality of gain material layers are formed that have varying dopant concentrations of one or more acoustic velocity varying dopants that provide different acoustic velocity effects over the plurality of layers. The gain material layers can be formed using methods such as Outside Chemical Vapor Phase Deposition, Inside Chemical Vapor Phase Deposition, Chemical Vapor Phase Reactor, Sol-Gel Spin Coating or the Candle-Wick technique. Although each technique employs a different method, each results in a preform with a plurality of layers having different acoustic velocity effects over the plurality of layers.

At 504, at least one transverse section of the plurality of layers is removed to provide a gain material core with a longitudinally varying acoustic velocity profile along the gain material core to suppress Stimulated Brillouin Scattering (SBS) effects by raising the SBS threshold. The gain material core can be doped with a gain dopant (e.g., rare earth dopant) to provide for amplifier amplification prior to, during or after the formation of the gain material core. At 506, the gain material core is shaped, polished and inserted into a cladding preform to form a composite preform. The cladding preform can have any of a variety of cross-sectional shapes, such as rectangular, elliptical, or "D"-shaped. The composite preform can be heated to bond the gain material core to the cladding preform. Once the composite preform is formed, the composite preform is drawn for example employing a drawing tower, at 508, to form the optical fiber amplifier.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the scope of the appended claims.

What is claimed is:

1. A method of forming an optical fiber amplifier, the method comprising:
   providing a composite preform having a gain material core that includes one or more acoustic velocity varying dopants to provide a longitudinally varying acoustic velocity profile along the gain material core to suppress Stimulated Brillouin Scattering (SBS) effects by raising the SBS threshold; and
   drawing the composite preform to form the optical fiber amplifier.

2. The method of claim 1, wherein the providing a composite preform having a gain material core comprises:
   forming a plurality of gain material layers having varying dopant concentrations of the one or more acoustic velocity varying dopants to provide varying acoustic velocity effects over the plurality of layers;

removing at least one transverse section of the plurality of gain material layers to provide the gain material core with the longitudinally varying acoustic velocity profile; and inserting the gain material core longitudinally into a cladding preform to form the composite preform.

3. The method of claim 2, wherein the forming of the plurality of gain material layers comprises:

forming a plurality of sections of gain material glass with varying dopant concentrations of the one or more acoustic velocity varying dopants, each section of the plurality of sections being prepared on a flat substrate using flame deposition; and bonding the plurality of sections of glass to form the plurality of gain material layers.

4. The method of claim 2, wherein the forming of the plurality of gain material layers comprises:

providing a gain material core fiber having a given dopant concentration of the one or more acoustic velocity varying dopants; and repeatedly depositing a layer of coating radially on the outside surface of the gain material core fiber with a sol-gel slurry and exposing the cylinder to a heat source to form a given layer for each of the plurality layers, wherein each layer has a different dopant concentration of the one or more acoustic velocity varying dopants than the previously deposited layer of coating.

5. The method of claim 2, wherein the forming of the plurality of gain material layers comprises:

providing a silica wafer on a susceptor in a reaction chamber; and repeatedly providing gas doped with a given dopant concentration of the one or more acoustic velocity varying dopants through an inlet port into the reaction chamber and heating and rotating the susceptor as the gas breaks down to form a given layer for each of the plurality of gain material layers, wherein the gas is doped with a different dopant concentration of the one or more acoustic velocity varying dopants for each of the plurality of gain material layers, such layers potentially being very thin so as to approximate a continuous variation in dopant concentration if desired.

6. The method of claim 2, wherein the forming of the plurality of gain material layers comprises:

providing a hollow glass cylinder;

repeatedly providing gas doped with a given dopant concentration of the one or more acoustic velocity varying dopants using one of outside or inside Chemical Vapor Phase Deposition to form a given layer for each of the plurality of gain material layers, wherein the gas is doped with a different dopant concentration of the one or more acoustic velocity varying dopants for each of the plurality of gain material layers, such layers potentially being very thin so as to approximate a continuous variation in dopant concentration if desired; and collapsing the cylinder with the plurality of gain material layers such that the density of the cylinder is substantially uniform.

7. The method of claim 2, wherein forming a plurality of gain material layers comprises:

providing a substrate; and repeatedly depositing a silica based sol gel doped with a given dopant concentration of the one or more acoustic velocity varying dopants on the substrate, rotating the substrate at a high speed to spread the doped solution over the substrate and allowing the substrate to dry to form a given layer for each of the plurality of gain material layers, wherein the silica based sol gel is doped with a different dopant concentration of the one or more acoustic velocity varying dopants for each of the plurality of gain material layers.

8. The method of claim 1, wherein the one or more acoustic velocity varying dopants are selected from the group comprising germanium, phosphorus, titanium, boron, fluoride, and aluminum.

9. The method of claim 1, wherein the one or more acoustic velocity varying dopants are selected and disposed in an appropriate mixing ratio to provide a substantially uniform index of refraction over the gain material core.

10. The method of claim 1, wherein the gain material core is silica doped with rare earth dopants to provide amplifier amplification for the optical fiber amplifier.

11. The method of claim 1, wherein the optical fiber amplifier has a length of about 2 to about 100 meters.

12. A method of forming an optical fiber amplifier, the method comprising:

forming a plurality of gain material layers having varying dopant concentrations of one or more acoustic velocity varying dopants to provide varying acoustic velocity effects over the plurality of gain material layers and to provide a substantially uniform index of refraction over the plurality of gain material layers;

removing at least one transverse section of the plurality of gain material layers to provide a gain material core with a longitudinally varying acoustic velocity profile and a substantially uniform index of refraction;

inserting the gain material core into a cladding preform to form a composite preform; and drawing the composite preform to form the optical fiber amplifier.

13. The method of claim 12, wherein the forming of the plurality of gain material layers comprises:

forming a plurality of sections of gain material glass with varying dopant concentrations of the one or more acoustic velocity varying dopants, each section of the plurality of sections being prepared on a flat substrate using flame deposition; and bonding the plurality of sections of glass to form the plurality of gain material layers.

14. The method of claim 12, wherein the forming of the plurality of gain material layers comprises:

providing a gain material core fiber having a given dopant concentration of the one or more acoustic velocity varying dopants; and repeatedly depositing a layer of coating radially on the outside surface of the gain material core fiber with a sol-gel slurry and exposing the cylinder to a heat source to form a given layer for each of the plurality layers, wherein each layer has a different dopant concentration of the one or more acoustic velocity varying dopants than the previously deposited layer of coating.

15. The method of claim 12, wherein the forming of the plurality of gain material layers comprises:

providing a silica wafer on a susceptor in a reaction chamber; and repeatedly providing gas doped with a given dopant concentration of the one or more acoustic velocity varying dopants through an inlet port into the reaction chamber and heating and rotating the susceptor as the gas breaks down to form a given layer for each of the plurality of gain material layers, wherein the gas is doped with a different dopant concentration of the one or more acoustic velocity varying dopants for each of the plurality of gain material layers.

16. The method of claim 12, wherein the forming of the plurality of gain material layers comprises:

providing a hollow glass cylinder;

repeatedly providing gas doped with a given dopant concentration of the one or more acoustic velocity varying dopants using one of outside or inside Chemical Vapor Phase Deposition to form a given layer for each of the plurality of gain material layers, wherein the gas is doped with a different dopant concentration of the one or more acoustic velocity varying dopants for each of the plurality of gain material layers; and collapsing the cylinder with the plurality of gain material layers such that the density of the cylinder is substantially uniform.

17. The method of claim 12, wherein forming a plurality of gain material layers comprises:

providing a substrate; and repeatedly depositing a silica based sol gel doped with a given dopant concentration of the one or more acoustic velocity varying dopants on the substrate, rotating the substrate at a high speed to spread the doped solution over the substrate and allowing the substrate to dry to form a given layer for each of the plurality of gain material layers, wherein the silica based sol gel is doped with a different dopant concentration of the one or more acoustic velocity varying dopants for each of the plurality of gain material layers.

18. The method of claim 12, wherein the one or more acoustic velocity varying dopants are selected from the group comprising germanium, phosphorus, titanium, boron, fluoride, and aluminum.

19. The method of claim 12, wherein the plurality of gain material layers are doped with rare earth dopants to provide amplifier amplification for the optical fiber amplifier.

* * * * *